United States Patent
Wong et al.

[11] Patent Number: 5,889,582
[45] Date of Patent: Mar. 30, 1999

[54] IMAGE-DIRECTED ACTIVE RANGE FINDING SYSTEM

[75] Inventors: Andrew K.C. Wong, Waterloo; Kurt D. Rueb, Kitchener, both of Canada

[73] Assignee: Virtek Vision Corporation, Waterloo, Canada

[21] Appl. No.: 814,457

[22] Filed: Mar. 10, 1997

[51] Int. Cl.$^6$ .............. G01C 3/08; G01B 11/24; H04N 7/18
[52] U.S. Cl. .............. 356/4.01; 356/376; 348/135
[58] Field of Search .............. 356/4.01, 3.01, 356/3.06, 5.01, 9, 376; 348/135

[56] References Cited

U.S. PATENT DOCUMENTS

| | | |
|---|---|---|
| Re. 34,900 | 4/1995 | Mogamiya et al. . |
| 3,610,755 | 10/1971 | Wieberger ............... 356/4 |
| 4,497,065 | 1/1985 | Tisdale et al. . |
| 4,584,704 | 4/1986 | Ferren . |
| 4,695,959 | 9/1987 | Lees et al. . |
| 4,810,088 | 3/1989 | Karning et al. ............... 356/5 |
| 4,979,815 | 12/1990 | Tsikos ............... 356/1 |
| 5,056,914 | 10/1991 | Kollodge ............... 356/5 |
| 5,218,414 | 6/1993 | Kajiwara . |
| 5,267,016 | 11/1993 | Meinzer et al. . |
| 5,270,780 | 12/1993 | Moran et al. ............... 356/5 |
| 5,343,284 | 8/1994 | Keeler et al. . |
| 5,386,285 | 1/1995 | Asayama . |
| 5,394,100 | 2/1995 | Bobler et al. . |
| 5,475,494 | 12/1995 | Nishida et al. . |
| 5,481,483 | 1/1996 | Ebenstein . |
| 5,521,695 | 5/1996 | Cathey, Jr. et al. . |
| 5,530,246 | 6/1996 | Hawkins . |
| 5,671,055 | 9/1997 | Whittlesey ............... 356/379 |
| 5,682,229 | 10/1997 | Wangler ............... 356/4.01 |
| 5,696,577 | 12/1997 | Stettner et al. ............... 356/4.01 |
| 5,699,149 | 12/1997 | Kuroda et al. ............... 356/4.01 |

FOREIGN PATENT DOCUMENTS 0449337 of 1991 European Pat. Off. .

OTHER PUBLICATIONS

Maver and Bajcsy, "Occlusions and the Next View Planning", May 1992, pp. 1806–1811.

*Primary Examiner*—Mark Hellner
*Attorney, Agent, or Firm*—Howard & Howard

[57] ABSTRACT

A 3D vision system utilizes a CCD camera to first generate a two dimensional image of the object. A computer analyzes the two dimensional image to determine areas of interest, such as high contrast areas which indicate sharp discontinuities. A laser range scanner, controlled by the computer, then scans the object at a variable resolution, increasing its resolution in the areas of interest to generate a computer model.

19 Claims, 1 Drawing Sheet

IMAGE-DIRECTED ACTIVE RANGE FINDING SYSTEM

BACKGROUND OF THE INVENTION

The present invention relates generally to 3-D vision systems, and more particularly to a vision system utilizing a laser range scanner which intelligently scans an object based upon images received from a CCD camera.

Passive vision systems, such as CCD cameras, acquire images of the object by sensing the ambient light reflected from the object. These systems require well-defined features such as targets or edges. Further, the quality of the information gathered by the CCD camera is affected by the ambient lighting conditions.

Active vision systems typically utilize a range-scanning laser and therefore do not depend upon ambient light. The laser range scanner obtains object coordinates from external information such as scanning angles, time of flight, or shape of projected patterns. However, the accuracy of the laser range scanner drops when measurements are performed on objects with sharp discontinuities, such as edges and holes. This can be overcome somewhat by increasing the resolution of the laser range scanner; however, increasing the resolution of the laser range scanner over the entire object increases the size of the computer data file to unmanageable dimensions. Increasing the size of the data file also increases the amount of processing needed to generate a computer model. Further, because only a small minority of the area of the object contains the sharp discontinuities, most of the additional data gathered by increasing resolution does not provide useful information about the shape of the object.

SUMMARY OF THE INVENTION

The present invention provides a vision system utilizing both a passive vision system and a laser range scanner to provide an "intelligent" scan of the object or scene, resulting in an accurate computer model of the object or scene without unnecessarily increasing the size of the computer data file. The reduced size of the data file also reduces processing time and permits the use of a less expensive laser scanner with a lower scanning rate.

The vision system of the present invention generally comprises a CCD camera and laser range scanner both controlled by and sending information to a CPU. The laser range scanner preferably includes a pair of X-Y galvos or other laser beam steering device, also controlled by the CPU.

Preferably, the laser beam is directed by the galvos onto a window on the CCD camera. The CCD camera window reflects the laser beam onto the object. The window is preferably transmittent of ambient light wavelengths reflected off the object to the CCD camera and is reflective of the particular wavelength of the laser beam.

The CCD camera generates a two-dimensional image of the object at a camera resolution. The laser range scanner is then directed sequentially onto a plurality of points on the object. The CCD camera generates an image of the object with the laser at each of the plurality of points and utilizes these images to calibrate the CCD camera with the laser range scanner.

The CPU analyzes a two-dimensional image generated by the CCD camera for "areas of interest." Areas of interest include high contrast areas, which indicate sharp discontinuities. The CPU then directs the laser range scanner to gather range information from the object, increasing the resolution of the laser range scanner in the areas of interest. During the scan, the laser range scanner may detect additional areas of interest from the range data, i.e. areas where the range information changes sharply. The CPU then directs the laser range scanner to re-scan these areas at a higher resolution, while the CPU updates the computer model of the object. Because the computer model of the object has increased resolution only in the "areas of interest," the accuracy of the computer model is maximized, while minimizing the size of the computer model data file.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
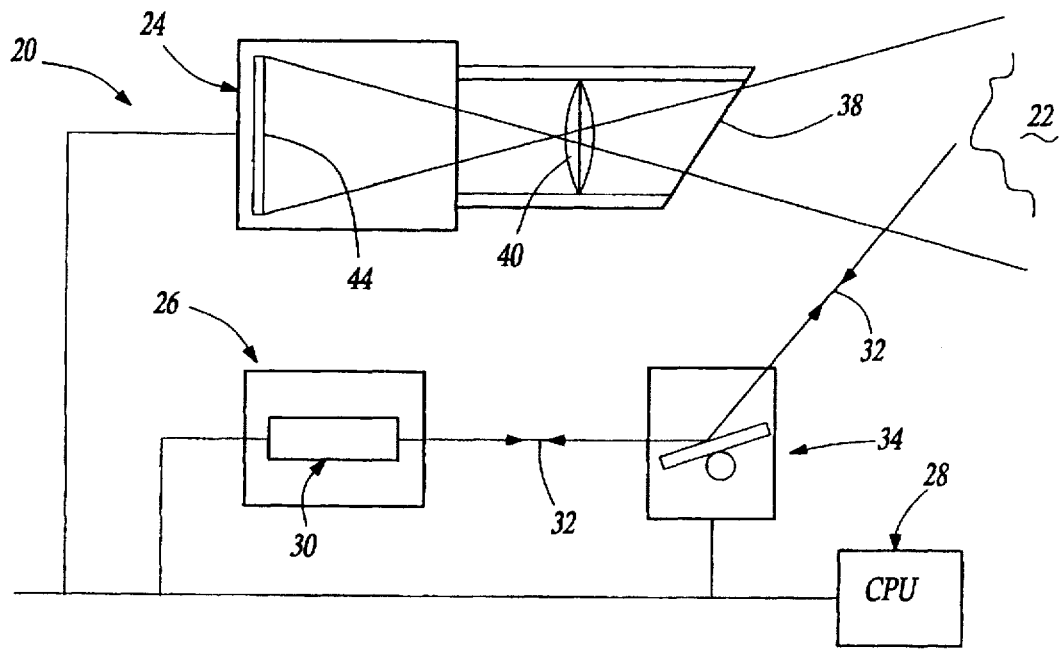
FIG. 1 is a schematic of the vision system of the present invention.

The vision system 20 of the present invention generates a computer model of an object 22. "Object" 22 as used herein could be one or more items and/or a scene. The vision system 20 generally comprises a CCD camera 24 and laser range scanner 26 which are controlled by and which send information to a CPU 28. The CCD camera 24 is preferably a high-resolution gray scale or color CCD camera such as are well known and are widely available commercially. The laser range scanner 26 includes a laser 30 generating a laser beam 32 which is directed by a laser beam directing device 34 onto the object 22. Preferably the laser beam directing device 34 is an X-Y pair of galvos 34 which are also controlled by the CPU 28. As is well-known in laser range scanners, the laser beam 32 is reflected back from the object 22 to the laser range scanner 26, thereby indicating the range of the object 22 at the selected point. The laser range scanner 26 is preferably positioned adjacent or near the CCD camera 24; however, because the laser range scanner 26 and CCD camera 24 are calibrated as described below, they can be directed at the object 22 at different angles. It is required only that they are both directed toward the object 22.

In operation, the CCD camera 24 preferably generates a two-dimensional image 44 of the object 22 as a plurality of X-Y points at the resolution of the CCD camera 24. The laser range scanner 26 and galvos 34 then direct the laser beam 32 sequentially onto a plurality of X-Y points on the object 22 while the CCD camera 24 generates an image of the object 22 with the laser beam 32 at each point. Preferably, four points are utilized to calibrate the CCD camera 24 and laser range scanner 26. The CPU 28 analyzes these images to locate the laser beam 32 at these plurality of points relative to the CCD camera 24 images, thereby calibrating the CCD camera 24 with the laser range scanner 26.

Figure 2:
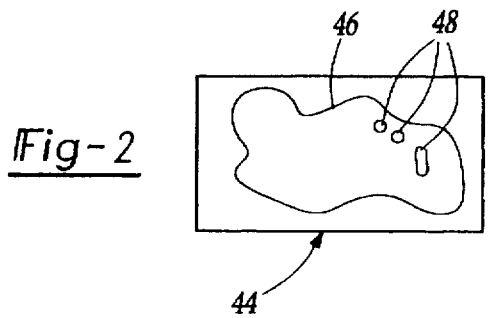
FIG. 2 illustrates the image as viewed by the vision system of FIG. 1.

The CPU 28 then analyzes a two-dimensional image 44, shown in FIG. 2, gathered by the CCD camera 24 for "areas of interest." Areas of interest preferably include high-contrast areas which indicate areas where more information should be gathered. For example, edges 46 of the object 22 or holes 48 in the object 22 produce high-contrast areas which are detected by the CCD camera 24 and CPU 28. The CPU 28 then directs the laser range scanner 26 to gather range information from the entire object 22. The CPU 28 directs the laser range scanner 26 to gather range information across the two dimensional image 44 gathered by the CCD camera 24 of object 22 at a variable scanner resolution, increasing the scanner resolution in the areas of interest. The scanner resolution is typically decreased below the camera resolution in flat, smooth areas and is preferably increased to more than ten or even one hundred times the camera resolution in the areas of interest.

The CPU 28 generates a computer model of the object 22 based upon the range information gathered by the laser range scanner 26 at the variable scanner resolution. Preferably the CPU 28 generates an irregular triangular mesh model or an attributed hypergraph model of the object 22, as these methods of generating a computer model is particularly suited for generating the model of the object 22 simultaneously with the scan by the laser range scanner 26. The CPU 28 can repeatedly modify portions of the model, such as when the areas of interest are re-scanned at an increased resolution. Further, the irregular triangular mesh model and the attributed hypergraph model are particularly suited for generating a computer model of the object 22 at a variable resolution. Each triangle is typically generated based upon many measurements from the laser range scanner 26, thereby providing some smoothing of the data as appropriate.

As the laser range scanner 26 scans the object 22, the CPU 28 may discover additional areas of interest, which are defined by variations in ranges between adjacent laser range points. The CPU 28 then directs the laser range scanner 26 to increase the resolution of the laser range scan in these areas of interest, and simultaneously update the triangular mesh model of the object 22.

As discussed above, the object 22 for which the CPU 28 has generated a computer model, may by an item or a scene or an item in a scene. In either case, once a computer model has been generated for the object 22, if there is a change in the object 22, such as a new item is placed in a known scene, the CCD camera 24 generates a subsequent two dimensional image of the new "object" 22 (new item in known scene). The CPU 28 then compares the new two-dimensional image with the known two-dimensional image to determine areas of interest. In this case the "areas of interest" are the new item. The CPU 28 then directs the laser range scanner 26 to scan the object 22, increasing the resolution of the laser range scan in the areas of interest, for example, which could be the new item in the known scene.

Because the computer model of the object has increased resolution only in the "areas of interest," the accuracy of the computer model is maximized, while minimizing the size of the computer model data file.

Figure 3:
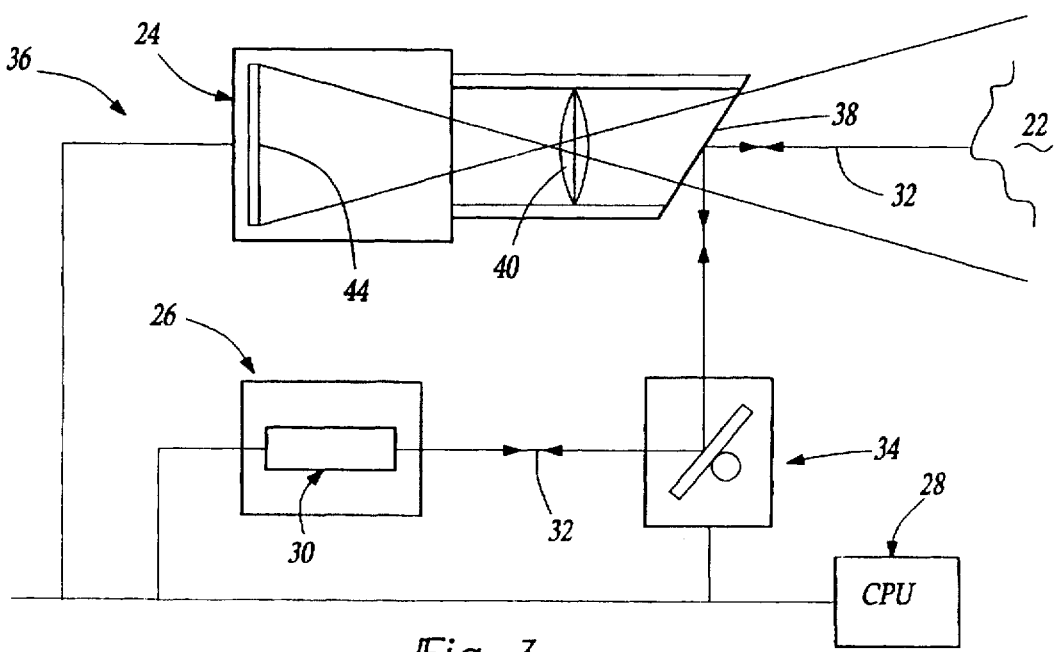
FIG. 3 is a schematic of an alternate embodiment of the vision system of FIG. 1.

An alternate vision system 36 is shown in FIG. 3, in which the CCD camera 24 includes a window 38 in front of a lens 40. The window 38 can be glass or half-silvered mirror. Preferably the window 38 transmits ambient light wavelengths reflected off of object 22 and is particularly reflective of the particular wavelength of the laser 30. Preferably, the galvos 34 direct the laser beam 32 to reflect off of window 38 and onto object 22. The laser beam then reflects off of the object 22 back off of the window 38, reflects off of galvos 34 back to the laser range scanner 26. Operation is otherwise as described for the embodiment shown in FIG. 1.

In accordance with the provisions of the patent statutes, the present invention has been described in what is considered to represent its preferred embodiment. However, it should be noted that the invention can be practices otherwise than as specifically illustrated and described without departing from its spirit.

What is claimed is:

1. A vision system for generating a model of an object comprising:

a camera generating a two-dimensional image of said object;

a laser range-finding system generating a laser, said laser scanning said object and measuring ranges of said object at a plurality of said points on said object based upon said two-dimensional image; and a computer generating a three-dimensional model of the object based upon said ranges as measured by said laser.

2. The vision system according to claim 1 further including:

a computer analyzing said two-dimensional image of said object;

said laser measuring ranges of said object at a scanner resolution, said scanner resolution being varied over said object based upon said computer analysis of said two-dimensional image.

3. The vision system according to claim 2 further including:

a computer analyzing said ranges at said plurality of points on said object;

said laser measuring ranges of said object at a scanner resolution, said scanner resolution being varied over said points on said object based upon said computer analysis of said ranges at said plurality of points.

4. The vision system according to claim 2 wherein said computer determines high-contrast areas of said two-dimensional image, said laser increasing said scanner resolution of said ranges in said high-contrast areas.

5. The vision system according to claim 2 wherein said computer determines boundaries of said object by analyzing said two dimensional image, said laser increasing said scanner resolution of said ranges at said boundaries.

6. The vision system according to claim 1 wherein said camera is a CCD camera.

7. The vision system according to claim 1 wherein said camera and said laser range scanner are directed toward said object at different angles.

8. A vision system comprising:

a camera generating a two-dimensional image of said object, said camera including a window through which light reflected from the object passes into said camera; and a laser range-finding system generating a laser, said laser scanning said object and measuring ranges of said object at a plurality of said points on said object, said laser being reflected off said window toward said object.

9. The vision system according to claim 8 wherein said window is more reflective of a first wavelength of said laser than a second wavelength reflected from said object.

10. The vision system according to claim 1 further including:

a computer generating a triangular mesh model of said object utilizing said ranges.

11. The vision system according to claim 1 further including at least one laser steering device directing said laser at said object.

12. A method for generating a model of an object including the steps of:
   a) generating a two-dimensional image of said object, said two-dimensional image including a plurality of points on said object;
   b) measuring ranges of said object at a plurality of said points based upon said two-dimensional image of said object; and
   c) generating a three-dimensional model of said object based upon said ranges.

13. The method according to claim 12 further including the steps of:
   c) generating a triangular mesh model of said object based upon said step b;
   said step c being performed simultaneously with said step b.

14. The method according to claim 12 further including the steps of:
   measuring ranges of said object at a scanner resolution;
   analyzing said two-dimensional image of said object to determine areas of interest; and
   increasing said scanner resolution in said areas of interest.

15. The method according to claim 14 wherein said areas of interest are high-contrast areas.

16. The method according to claim 14 wherein said areas of interest are edges of said object.

17. The method according to claim 12 further including the steps of:
   measuring ranges of said object at a scanner resolution;
   analyzing said ranges to determine areas of interest; and
   increasing said scanner resolution in said areas of interest.

18. The method according to claim 17 further including the steps of:
   directing a laser at said object at a first point on said object;
   locating said laser on said first point on said two dimensional image; and
   calibrating said laser with said two-dimensional image.

19. The vision system according to claim 10 wherein said computer generates said model while said laser is measuring said ranges.

* * * * *

UNITED STATES PATENT AND TRADEMARK OFFICE
Certificate

Patent No. 5,889,582                                                    Patented: March 30, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Andrew K. C. Wong, Kurt D. Rueb, and Reda E. Fayek.

Signed and Sealed this Nineteenth Day of October, 1999.

*THOMAS H. TARCZA*
*Supervisory Patent Examiner*
*Art Unit 3662*